US007841015B2

(12) United States Patent
Arnold et al.

(10) Patent No.: US 7,841,015 B2
(45) Date of Patent: Nov. 23, 2010

(54) METHOD FOR DETERMINING A DOPANT CONCENTRATION IN A SEMICONDUCTOR SAMPLE

(75) Inventors: Walter Arnold, Saarbrücken (DE); Kerstin Schwarz, Rehlingen-Siersburg (DE); Ute Rabe, Saarbrücken (DE)

(73) Assignee: Fraunhofer-Gesellschaft zur Förderung der Angewandten Forschung E.V., Munich (DE)

( * ) Notice: Subject to any disclaimer, the term of this patent is extended or adjusted under 35 U.S.C. 154(b) by 79 days.

(21) Appl. No.: 12/281,806

(22) PCT Filed: Feb. 28, 2007

(86) PCT No.: PCT/EP2007/001736

§ 371 (c)(1),
(2), (4) Date: Sep. 22, 2008

(87) PCT Pub. No.: WO2007/104432

PCT Pub. Date: Sep. 20, 2007

(65) Prior Publication Data

US 2009/0100554 A1    Apr. 16, 2009

(30) Foreign Application Priority Data

Mar. 12, 2006 (DE) ........................ 10 2006 011 660

(51) Int. Cl.
*G01Q 60/46* (2010.01)
(52) U.S. Cl. ................ 850/44; 850/33; 850/39
(58) Field of Classification Search .......... 850/33, 850/39, 44; 977/840, 860, 863, 866, 880
See application file for complete search history.

(56) References Cited

U.S. PATENT DOCUMENTS

| 5,461,907 | A | 10/1995 | Tench et al. |
| 6,185,991 | B1* | 2/2001 | Hong et al. ................ 73/105 |
| 6,211,540 | B1 | 4/2001 | Takahashi et al. |
| 2003/0234358 | A1* | 12/2003 | Higgins et al. .............. 250/306 |
| 2004/0051542 | A1* | 3/2004 | Miles et al. ................. 324/754 |

OTHER PUBLICATIONS

Tran, et al ("Quantitative two-dimensional carrier profiling of a 400 nm complementary metal-oxide-semiconductor device by Schottky scanning capacitance microscopy" J. Appl. Phys., v. 88, No. 11, Dec. 1, 2000, pp. 6752-6757).*

(Continued)

*Primary Examiner*—Jack I Berman
*Assistant Examiner*—Michael Maskell
(74) *Attorney, Agent, or Firm*—Antonelli, Terry, Stout & Kraus, LLP.

(57) ABSTRACT

A method is described for determining a dopant concentration on a surface and/or in layer region lying close to the surface of a semiconductor sample using an atomic force microscope, whose leaf-spring tip is brought into contact with the semiconductor sample, forming a Schottky barrier, wherein an electric alternating potential is applied between the spring-leaf tip and the semiconductor sample in the region of the Schottky barrier in such a way that a space charge region inside the semiconductor sample defining the three-dimensional extension of the Schottky barrier is excited and begins to oscillate within the confines of its spatial extension, said oscillations are transmitted to the leaf-spring, are detected and form the basis for determining the dopant concentration.

16 Claims, 3 Drawing Sheets

OTHER PUBLICATIONS

Williams, C.C. "Two-dimensional dopant profiling by scanning capacitance microscopy", Annu. Rev. Mat Sci., 1999, 29, 471-504.*

P. De Wolf et al: "Status and Review of Two-Dimensional Carrier and Dopant Profiling Using Scanning Probe Microscopy", J. Vac. Sci. Technol. B 18, pp. 361-368 (2000).

T. Hochwitz et al: "Capacitive Effects on Quantitative Dopant Profiling with Scanned electrostatic Force Microscopes", J. Vac. Sci. Technol. B 14, pp. 457-462 (1996).

S. Jeffrey et al: "Quantitative Electrostatic Force Measurement in AFM", Applied Surface Science 157, pp. 280-284 (2000).

P. De Wolf et al: "Two-Dimensional Carrier Profiling of InP Structures Using Scanning Spreading Resistance Microscopy", Appl. Phys. Lett. 73, pp. 2155-2157 (1998).

U. Zerweck et al: "Accuracy and Resolution Limits of Kelvin Probe Force Microscopy", Physical Review B 71, pp. 125424-1 to 125424-9 (2005).

T. Tran et al: "Quantitative Two-Dimensional Carrier Profiling of a 400 nm Complementary Metal-Oxide-Semiconductor Device by Schottky Scanning Capacitance Microscopy", Journal of Applied Physics, American Institute of Physics, New Yor, U.S., Bd. 88, Nr. 11, Dec. 1, 2000, pp. 6752-6757, XP012051043, ISSN: 0021-8979.

J.M.R. Weaver et al: "High Resolution Atomic Force Microscopy Potentiometry", Journal of Vacuum Science and Technology: Pat B, AVS/AIP, Melville, New York, NY, U.S., Bd. 9, Nr. 3, May 1, 1991, pp. 1559-1561, XP000222582, ISSN: 1071-1023.

* cited by examiner

METHOD FOR DETERMINING A DOPANT CONCENTRATION IN A SEMICONDUCTOR SAMPLE

BACKGROUND OF THE INVENTION

1. Field of the Invention

The invention relates to a method for determining a dopant concentration on a surface and/or in layer region lying close to the surface of a semiconductor sample using an atomic force microscope.

2. Description of the Prior Art

One possibility for doping a semiconductor is the ion implantation method, in which atoms and molecules are ionized, accelerated in an electric field and shot into a solid. The depth of penetration of the ions into the solid depends on their energy, which is typically between several keV and several MeV, and their mass, as well as the mass of the atoms of the solid. Thus, the average range of 10 keV phosphorus ions in silicon is approximately 14 nm and of 1 MeV boron ions in silicon 1.8 µm. By ion bombardment of a solid, it is possible to vary many properties such as electrical and optical properties of a solid, variation in volume, mechanical stresses in the solid surface or the near-surface layer of the solid, as can be deduced from the book by H. Ryssel, I. Ruge: "Ion implantation", Teubner, Stuttgart, 1978. After doping has been carried out, it is therefore of great interest to determine the dopant concentration in order to obtain better knowledge about the dependence between the dopant distribution inside a solid and the solid properties changed by the doping.

There are therefore a number of techniques for determining the dopant concentration in a solid consisting mainly of semiconductor material, in which atomic force microscopy is used, see also G, Binnig C. F. Quate and C. Gerber, Atomic Force Microscopy, Phys. Rev. Lett. 56, 930-933 (1986), where a small leaf spring having a length of about 100 µm to 500 µm with a tip is scanned by means of piezoelectric adjusting elements over a surface region of a solid sample to be studied, wherein a position sensor measures the deflection of the leaf spring in such a manner that a laser beam is focussed onto the back of the leaf spring, reflected there and deflected onto a photodiode. A bending of the leaf spring effects a variation in the angle of reflection of the laser beam and associated with this, a variation in the photovoltage which can be tapped at the photodiode, by which means the topography of the surface can be imaged, whereby the sensor or the sample is tracked during scanning perpendicular to the sample surface, that is in the z-direction by means of a control loop in such a manner that the deflection of the leaf spring remains constant. The z-voltage is coded as a color value and represented as a topographic image by means of a computer.

The surface topography of the sample can be varied by the process of doping a semiconductor sample using high acceleration voltages. If roughening of the surface occurs, the doped region can be detected by scanning the topography by means of conventional atomic force microscopy. However, with this technique it is difficult to make any prediction of the ion concentration in the space charge zone which is formed after doping.

In the article by P. de Wolf, M Geva, T. Hantschel, W. Vanderworst and R. P. Bylsma, Two-dimensional Carrier Profiling of InP Structures Using Scanning Spreading Resistance Microscopy, Appl. Phys. Lett. 73, 2155-2157 (1998), force microscopy is used to detect charge distributions in semiconductor surfaces in which the tip of a conductive leaf spring is scanned over the surface of a semiconductor element. By applying a static force, the tip is pressed into the semiconductor element to be studied. The contact radius is given by the Hertz contact mechanics and is typically 30 nm. A DC voltage is applied to the sensor bar. The resultant current through the sample is measured on the underside of the sample as a function of the tip position with the aid of a logarithmic amplifier. The overall measured resistance is made up of the sum of the contact resistance and the volume resistance of the sample. By scanning over the surface, an image of the conductivity distribution and ultimately of the doping of wafer or the semiconductor structure can thus be obtained. The three-dimensional resolution of the method is determined by the contact radius of the sensor tip. This technique is also used to characterize pn-junctions and opto-electronic structures and is called "scanning spreading resistance microscopy" (SSRM).

Another technique for detecting doping is so-called "scanning capacitance spectroscopy" (SCM). In this technique the doping can be detected on the one hand by means of a metal-semiconductor contact, that is a Schottky barrier, between the tip and the component, or the tip and/or the component to be studied can be provided with an insulating layer so that the electrical contact resistance remains sufficiently high. The measured quantity in this case is the local electrical capacitance between tip and surface. Charge distributions cause a variation in the capacitance and therefore a contrast for a pictorial representation. The capacitance is determined with the aid of known electrical measuring techniques, see for example J. R. Matey and J. Blanc, Scanning Capacitance Microscopy, J. Appl. Phys, 57, 1437-1444 (1985).

A contact-free method of investigation between leaf spring tip and sample body surface is described by Loppacher et al. by means of so-called "Kelvin Probe Force Microscopy" (KPFM) under vacuum conditions, C Loppacher, U. Zerweck, S. Teich, E. Beyreuther, T. Otto, S. Grafström and L. M. Eng, FM Demodulated Kelin Probe Force Microscopy for Surface Photovoltage Tracking, Nanotechnology 16, pages 1-6 (2005). The local surface potential is detected merely by detecting electrostatic forces between the leaf spring tip and the sample surface, wherein the leaf spring tip and the same surface are not in mechanical contact. The leaf spring is made to oscillate resonantly by applying an electrical alternating voltage between lead spring tip and the sample to be investigated. In addition, a DC voltage is applied between sample and tip in such a manner that the electrostatic forces are compensated to zero. The applied DC voltage is recorded, whereby the surface potential of the sample is obtained, which is dependent on the charge distribution. In addition, the surface can be irradiated with light having a photon energy greater than the band gap of the semiconducting solid or the dopant, whereby electron-hole pairs are formed inside the space charge layer which move towards near-surface regions as a result of different work functions and consequently lead to a variation in the surface potential that can be measured by means of the electrostatic forces. Thus, this technique can be used to obtain information about surface states and charge mobilities such as, for example, diffusion lengths, recombination rates. This method has the advantage that the electrical field between tip and sample is very low, which leaves the electronic band structure of the investigated solid virtually unchanged.

A further method for detecting doped regions applies eddy current techniques in conjunction with magnetic force microscopy (Magnetic Force Microscopy, MFM), see also M. A. Lantz, S. P. Jarvis and H Tokumoto, High Resolution Eddy Current Microscopy, Apply. Phys. Lett. 78, 383-385 (2001). An oscillating leaf spring with a magnetic tip moves over a conductive surface. The oscillation of the leaf spring induces an eddy current field in the sample surface, whose scattered field is again coupled back to the tip. The variation of the oscillation amplitude of the leaf spring gives an indication of the local conductivity of the sample. The resolution of the method is determined by the magnetic scattered field and is a few 100 nm.

Ultrasonic waves can also be detected with the sensor tip of a force microscope and this with the high lateral resolution of a force microscope, as can be deduced from German Patent 43 24 983 B1. In atomic force acoustic microscopy (AFAM) an ultrasonic test head is located under the sample, which emits longitudinal or transverse waves into the sample and thus causes displacements perpendicular to the surface or laterally to the surface. The ultrasonic transducer is connected to a frequency generator which supplies it with a sinusoidal alternating voltage. If the tip of the spring bar is in contact with the sample surface, the oscillations will be transmitted from the sample to the leaf spring. The resonance frequencies of the leaf spring depend on the physical forces acting on the tip. The resonances of the leaf spring in contact with the sample surface are designated as contact resonances of the sample-leaf spring system, see also U. Rabe, K. Janser and W. Arnold, "Vibrations of Free and Surface-Coupled Atomic-Force Microscope Cantilevers: Theory and Experiment", Rev. Sci. Instr. 67, 3281-3291 (1996). Elastic properties of materials can be determined with the aid of contact resonances. Since dopings influence the elastic properties of semiconductors, these can likewise be detected using the AFAM technique.

SUMMARY OF THE INVENTION

The invention is a method for determining a dopant concentration on a surface and/or in a layer region lying close to the surface of a semiconductor sample using an atomic force microscope in such a manner that the dopant concentrations can be detected with a lateral resolution of less than 100 nm. In this case, it is important to keep the measurement-technology expenditure as low as possible so that extended rounds of measurement such as are required, for example for the previously explained capacitance measurement, are avoided.

The method of the invention for determining a dopant concentration on a surface and/or in a layer region lying close to the surface of a semiconductor sample using an atomic force microscope, comprises bringing a leaf-spring tip of the atomic force microscope into contact with the semiconductor sample, forming a Schottky barrier, wherein an electric alternating potential is applied between the spring-leaf tip and the semiconductor sample in the region of the Schottky barrier so that a space charge region inside the semiconductor sample defining the three-dimensional extension of the Schottky barrier is excited and begins to oscillate within the confines of its spatial extension, the oscillations transmitted to the leafspring, are detected and form the basis for determining the dopant concentration.

The method, which is designated by the applicant as Scanning Schottky Vibration Spectroscopy (SSVM), differs from the previously known methods in that it uses contact resonances, wherein the oscillations of the lead spring are measured. In this case, the leaf spring tip is a metal or is at least coated with a metal layer and forms a so-called Schottky barrier or Schottky contact on contact with the semiconductor surface, during which, as a result of the different Fermi levels between semiconductor and metal, a space charge zone is created, which is formed as a charge carrier depletion layer in the semiconductor. If an electrical alternating voltage is applied in the region of the Schottky contact, the size of the space charge zone varies depending on the alternating voltage, that is it becomes larger or smaller. The variation in the thickness of the forming space charge zone is associated with a lattice distortion of the semiconductor material which again can have different causes. According to the present understanding of the effect to be observed, in which the semiconductor material exhibits local oscillating volume fluctuations, it is assumed that lattice distortions are formed by means of the attraction between the negative electrons in the metal and positively charged atomic cores in the electron depletion zone in the semiconductor. The periodic lattice distortions in the doped region bring about periodic lattice distortions in the surrounding semiconductor sample and can likewise excite the leaf spring in contact with the doped semiconductor region to oscillate. The oscillations transmitted to the leaf spring are detected using a photodiode by means of the laser beam reflected at the back of the leaf spring, passed to a lock-in amplifier or another suitable amplifier and finally fed to an evaluation unit preferably being an oscillograph and computer in which the characteristic oscillation signal is allocated to a dopant concentration. The allocation of dopant concentration values to measured signal values can be made with suitable reference measurements which have been carried out on semiconductor samples of known dopant concentrations.

The decisive advantage of the method for determining the dopant concentration according to the invention can be seen in that the measurements can be carried out using commercially available scanning microscopes, wherein the contact forces acting between the leaf spring tip and the semiconductor sample are far below one μN, that is far below that in the SSRM technique, for example, where contact forces of about 10 μN prevail. It is therefore possible with the method according to the invention to protect the semiconductor sample to be studied and also the leaf spring tip during the measurement process. The lower contact forces also result in a smaller contact radius. The contact radius determines the lateral spatial resolution of the method. The method according to the invention for determining the dopant concentration thus has a higher local resolution than, for example, the SSRM technique.

BRIEF DESCRIPTION OF THE DRAWINGS

The invention is described in an exemplary manner hereinafter using exemplary embodiments with reference to the drawings without restricting the general inventive idea. In the figures.

DESCRIPTION OF THE INVENTION

Figure 1:
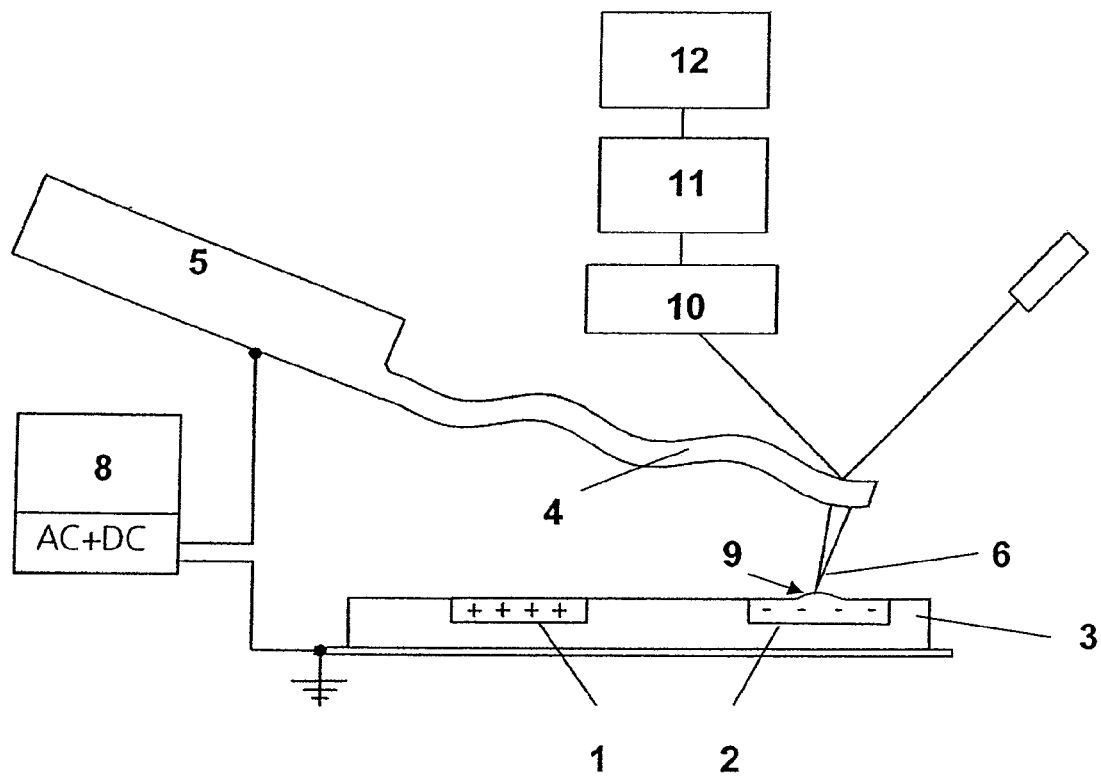
FIG. 1 shows a schematic representation for the formation of a Schottky barrier or Schottky contact between leaf spring tip and doped semiconductor sample.
Figure 2:
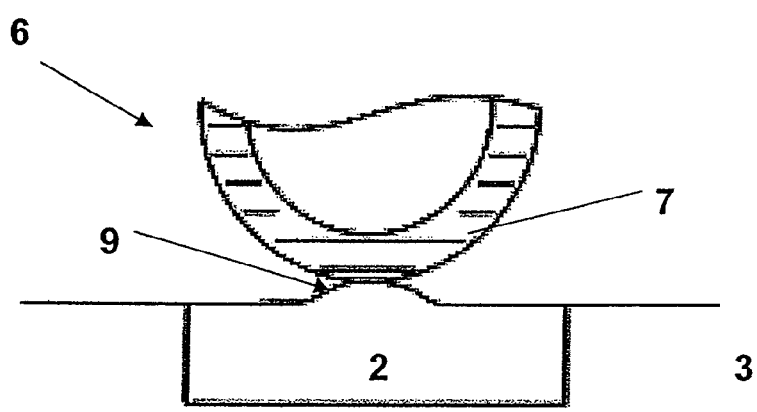
FIG. 2 shows an experimental setup for detecting doped semiconductor regions.

FIG. 1 shows the experimental setup for detecting doped regions 1 and 2 depending on whether they are positively or negatively doped, of a semiconductor sample 3. The device for investigating or determining the dopant concentration in the respective semiconductor regions 1 and 2 does not differ from a scanning microscope arrangement known per se, in which a leaf spring 4 clamped on one side, usually connected on one side to a chip 5, is scanned over the surface of the semiconductor probe 3. At the free end of the leaf spring 4 there is provided a sensor tip 6 which, in the method according to the invention for determining dopant concentration is brought into contact with the semiconductor sample 3, especially with the doped regions 1 and 2. The sensor tip 6, which mostly consists of silicon and is shown in a detailed cross-sectional view in FIG. 2 is surrounded with a metallic electrically conductive coating 7. Through contact of the sensor tip 6 with, for example, the doped region 1 of the semiconductor sample 3, a Schottky barrier is formed between the tip 6 and the semiconductor sample 3, whose space charge zone depleted in charge carriers projects into the region of the semiconductor sample 3 or the doped region 1.

Furthermore, in a manner known per se, a function generator 8 is connected to the conductive or conductively coated leaf spring 4 via the suspension of the leaf spring 4, that is via the chip 5, which generates an alternating voltage (AC) of predefinable frequency and amplitude between the semiconductor sample 3 and the leaf spring 4, which can be superposed with a DC component (DC) if required.

When an alternating voltage is applied between the sensor tip 6 and the semiconductor sample 3, the Schottky barrier formed inside the semiconductor sample 3 periodically varies its three-dimensional extension of the space charge zone. It is shown that the semiconductor surface located in the contact region undergoes three-dimensional deformations 9 by which means the sensor tip 6 is deflected both laterally and, in particular, perpendicular to the sample surface.

According to the present state of knowledge about the coupling mechanism initiating the local volume oscillations inside the semiconductor sample, it is assumed that the formation of the space charge zone caused by the different Fermi levels between the metal sensor tip and the doped semiconductor material is dependent firstly on the position of the Fermi level, secondly on the dopant concentrations inside the doped semiconductor regions and ultimately also depends on the alternating voltage applied between the sensor tip 6 and the semiconductor sample 3 or the doped regions 1, 2". In principle, there are a plurality of different coupling mechanisms, for example, modulation of the band edge via the so-called deformation potential, piezoelectric effects, electrostrictive coupling effects as well as capacitive force effects which, depending of the choice of material, are more or less dominantly responsible for the volume lattice distortions formed. According to the present understanding, it is assumed that the coupling to lattice distortions takes place by means of attractive forces between the negative electrons in the metal and the positively charged atomic cores in the electron depletion zone in the semiconductor.

Regardless of the coupling mechanism ultimately causing the volume oscillations of the doped semiconductor regions, it has been identified according to the invention that the oscillations transmitted to the leaf spring 4 via the sensor tip 6 are detected by means of a photodiode 10 with the aid of the laser beam reflected at the back of the leaf spring 4, generating an oscillation signal which is passed to a lock-in amplifier 11 or another suitable amplifier and then fed to an evaluation unit 12 usually having an oscillograph and/or a computer and a suitably generated oscillation signal is correlated with a dopant concentration. For example, the amplitude or the phase of the oscillation signal which can be tapped from the lock-in amplifier 11 can be recorded. The allocation of the measured values to the dopant concentrations can be made with the aid of reference experiments carried out in advance and using dopant concentration values thereby obtained. During the measurement of the dopant concentration, the topography of the surface is detected by the feedback electronics usually provided in commercial force microscopes and the static application force of the leaf spring is kept constant. Alternatively only the topography of the surface can be measured in a first pass and then the dopant concentration in a second pass using the now known height information. Furthermore, the oscillation signal that can be tapped from the lock-in amplifier 11 can be fed back to the function generator 8 in order to thus more accurately image the oscillation signal in the investigated region of the sample.

It is particularly advantageous if the frequency $\omega/2\pi$ of the alternating voltage AC applied between the leaf spring 4 and the semiconductor sample 3 is selected such that it lies near a contact resonance frequency of the leaf spring 4. If an alternating voltage having precisely this frequency $\omega/2\pi$ is applied between the sensor tip 6 of the leaf spring 4 and an opposing electrode located under the semiconductor sample 3, the three-dimensional extension of the space charge zone between the sensor tip 6 and the semiconductor sample 3 in the doped region 1 or 2 varies periodically with the same frequency. Since the leaf spring 4 with its sensor tip 6 is in contact with the sample surface, it undergoes excitation at the same frequency $\omega/2\pi$. In this case, the doping surface acts in different ways on the oscillations forming along the leaf spring 4, especially as on the one hand, the contact resonance frequency $\omega/2\pi$ and also the excited oscillation amplitude and phase depend on the local doping. This results in various possibilities for signal evaluation of the oscillation signal generated by the photodiode 10. On the one hand, the variation of the oscillation amplitude and phase of the leaf spring 4 as a function of the location can be used to detect the doping. A variation in the amplitude and phase of the bar oscillation can either be caused directly by different types of oscillation excitation in the differently doped regions or indirectly since the contact resonance frequency can be different on the differently doped areas of the sample. On the other hand, the variation of the contact resonance frequency itself can likewise be used to detect the doped regions 1 and 2. For this purpose, either the transmission frequency can be varied in a small predefined frequency range about the postulated contact resonance frequency during scanning at each location, the response of the bar measured and the resonance frequency determined from the maximum of this response, or the contact resonance frequency can be detected by an additional feedback loop which continuously adjusts the frequency of the function generator 8 so that the amplitude of the bar has a maximum.

Figure 3:
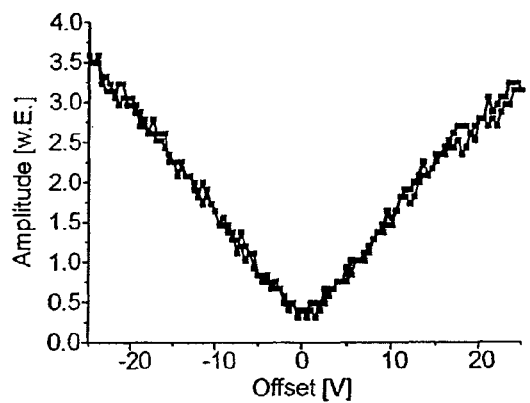
FIG. 3 shows a graphical representation of a measured oscillation amplitude.
Figure 4:
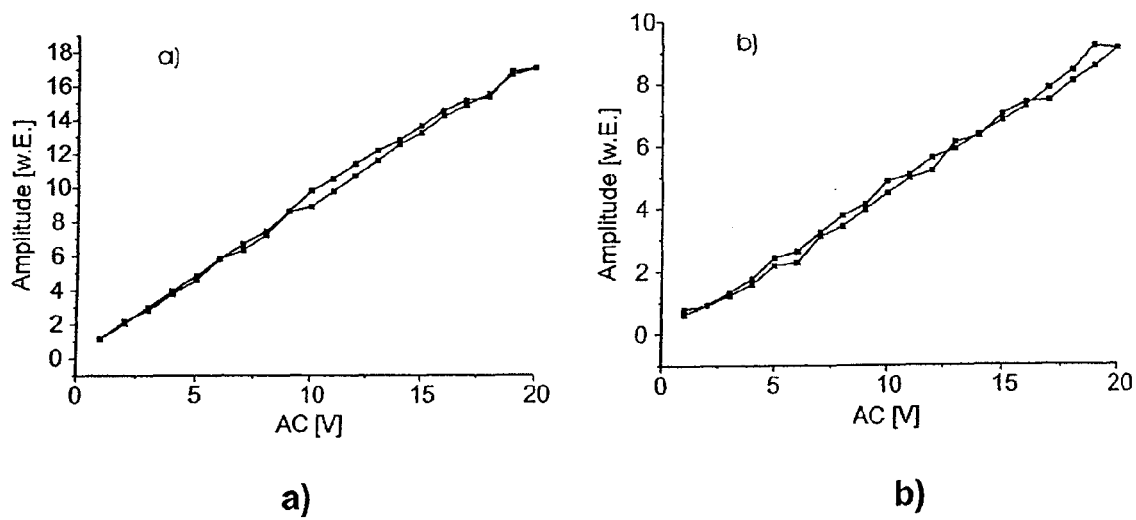
FIGS. 4a), b) show a graphical representation of a measured oscillation amplitude for different DC voltage levels.

With reference to the measurement diagram shown in FIG. 3, where the DC component applied via the applied alternating voltage between sensor tip 6 and semiconductor sample 3 is plotted on the abscissa and the respectively detected oscillation amplitudes are plotted on the ordinate, the oscillation amplitude at the first bending contact resonance frequency can be deduced as a function of the applied DC component. The measurement has been made on a silicon wafer which provides an ion implanted region with boron. The DC voltage was initially increased from 0 V to +25 V and then reduced to −25 V and then returned to 0 V. In this case, both the amplitude and also the frequency of the electrical alternating voltage applied between the sensor tip 6 and the semiconductor sample is left constant. It is shown that the oscillation amplitude increases linearly with the magnitude of the DC voltage. In addition, it can be established that the oscillation amplitude of the spring bar depends on the amplitude of the applied alternating voltage. This relationship can be deduced from the diagrammatic representations according to FIGS. 4a and b. In this diagram the oscillation amplitude of the leaf spring is also plotted along the ordinates while the amplitude of the alternating voltage in V peak-to-peak is plotted on the abscissa. In this case, the amplitude of the alternating voltage is increased from 1 V peak-to-peak to 20 V peak-to-peak and is reduced again to 1 V peak-to-peak. The frequency of the alternating voltage remains constant during the measurement. The DC voltage is −0.6 V in FIG. 4a) and +0.6 V in FIG. 4b).

Figure 5:
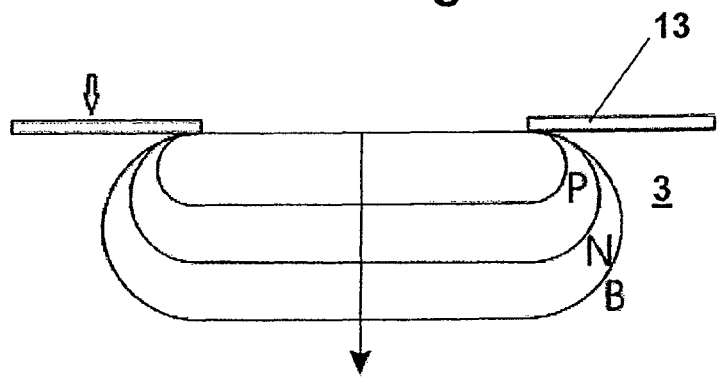
FIG. 5 shows a diagram of contour lines of equal dopant concentration in a masked semiconductor sample.
Figure 6:
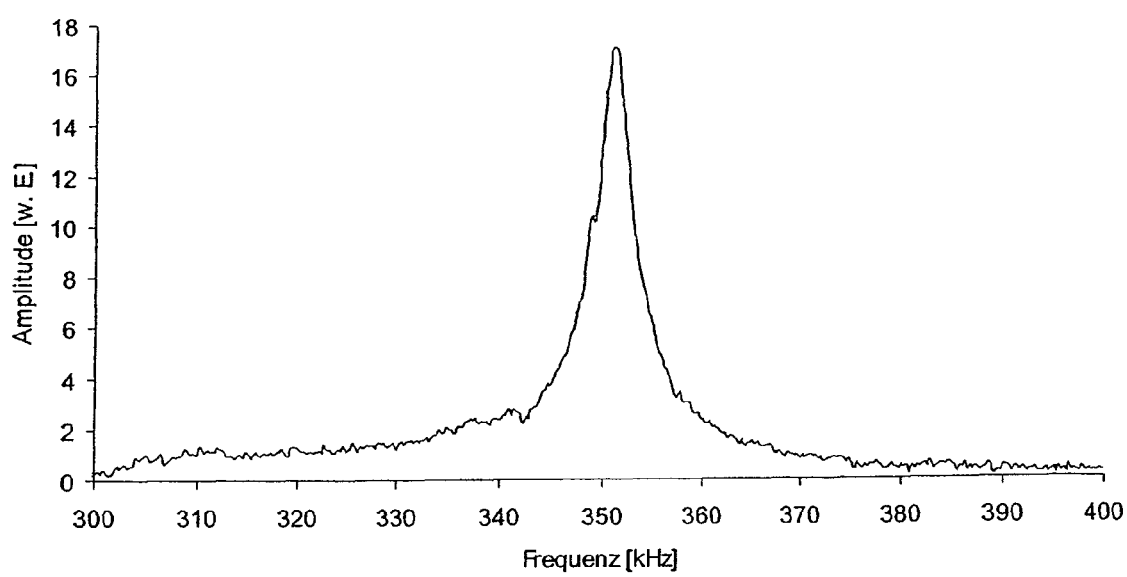
FIG. 6 shows the spectrum of a recorded contact resonance between leaf spring tip and semiconductor sample.

As a result of the high lateral resolution for detecting the dopant concentration, in addition to the doped regions themselves, edge layers of implanted regions which can be attributed to the lateral scatter during the doping can be detected. The contrast in the oscillation amplitude between implanted and non-varied regions inside the semiconductor sample does not end with the edge of the implanted region but goes beyond. This can be attributed to the lateral scattering experienced by the ions impinging perpendicularly to the surface in the crystal. FIG. 5 shows a doped semiconductor sample 3 shown in cross-section, having a doping mask 13 placed on its upper side through which the lateral doping region inside the semiconductor sample 3 should be limited. It is shown that the lateral scattering width of boron B, nitrogen N and phosphorus P during ion implantation through a silicon semiconductor sample is of varying size. With the aid of the method according to the solution it is also possible to detect dopant concentrations exactly in precisely these edge layer regions. It could be shown that at a doping dose of $5\times10^{15}$ BF2-ions/cm2, a signal-noise ratio of about 35 Db is present (FIG. 6). Here the exciting voltage was 20 Volts and the DC voltage component −0.6 V. With an ion penetration depth of about 200 nm this corresponds to a concentration of $2.5\times10^{20}$ ions/cm3. Assuming a signal-noise ratio of 35 dB as a basis, and the dependences shown in FIGS. 2 and 3, a doping of at least $10^{18}$ ions/cm$^3$ must therefore be detectable. It remains to be noted that lower dopings produce a larger signal because of the greater extension of the Schottky barrier as long as the coupling to the elastic distortion remains the same.

REFERENCE LIST 1 and 2 Doped regions
3 Semiconductor sample
4 Leaf spring
5 Chip
6 Sensor tip
7 Metal layer
8 Function generator
9 Volume variation
10 Photodiode
11 Lock-in amplifier
12 Evaluation unit
13 Mask

The invention claimed is:

1. A method for determining a dopant concentration on a surface and/or in a layer region spaced from the surface of a semiconductor sample using an atomic force microscope including a leaf-spring tip which is brought into contact with the semiconductor sample comprising:
forming a Schottky barrier;
applying an electrical alternating potential between the spring-leaf tip and the semiconductor sample in a region of the Schottky barrier to excite a space charge region inside the semiconductor sample defining a three-dimensional extension of the Schottky barrier, which oscillates dimensionally within a spatial extension thereof;
transmitting the dimensional oscillations to the leaf-spring;
detecting the dimensional oscillations with the leaf-spring; and
in response to detecting the dimensional oscillations, determining the dopant concentration.

2. The method according to claim 1, wherein:
the oscillations are excited to produce a contact resonance between the leaf spring and the semiconductor sample.

3. The method according to claim 1, comprising:
transmitting a contact resonance frequency, an amplitude and/or a phase of the oscillations to the leaf spring for determining the dopant concentration.

4. The method according to claim 2, wherein:
a contact resonance frequency, an amplitude and/or a phase of the oscillations to the leaf spring for determining the dopant concentration.

5. The method according to claim 3, wherein:
determination of the dopant concentration utilizes a signal feedback for detecting a variation the contact resonance frequency.

6. The method according to claim 4, wherein:
determination of the dopant concentration utilizes a signal feedback for detecting a variation of the contact resonance frequency.

7. The method according to claim 5, wherein:
the dopant concentration is determined by detecting a variation in amplitude and/or phase of the oscillations of the leaf spring as a function of a location.

8. The method according to claim 6, wherein:
the dopant concentration is determined by detecting a variation in amplitude and/or phase of the oscillations of the leaf spring as a function of a location.

9. The method according to claim 1,
applying a DC potential to the leaf spring.

10. The method according to claim 2,
applying a DC potential to the leaf spring.

11. The method according to claim 3,
applying a DC potential to the leaf spring.

12. The method according to claim 4,
applying a DC potential to the leaf spring.

13. The method according to claim 5,
applying a DC potential to the leaf spring.

14. The method according to claim 6,
applying a DC potential to the leaf spring.

15. The method according to claim 7,
applying a DC potential to the leaf spring.

16. The method according to claim 8,
applying a DC potential to the leaf spring.

* * * * *